(12) United States Patent
Kumar et al.

(10) Patent No.: US 10,382,692 B1
(45) Date of Patent: Aug. 13, 2019

(54) DIGITAL PHOTO FRAMES WITH PERSONALIZED CONTENT

(71) Applicant: Amazon Technologies, Inc., Seattle, WA (US)

(72) Inventors: Sumesh Santha Kumar, Bangalore (IN); William R. Hazlewood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 15/340,364

(22) Filed: Nov. 1, 2016

(51) Int. Cl.
| G06K 9/00 | (2006.01) |
| H04N 1/00 | (2006.01) |
| G06F 16/51 | (2019.01) |
| G06F 21/32 | (2013.01) |
| H04N 5/232 | (2006.01) |
| G06F 16/583 | (2019.01) |

(52) U.S. Cl.
CPC ......... *H04N 5/23293* (2013.01); *G06F 16/51* (2019.01); *G06F 16/5838* (2019.01); *G06F 21/32* (2013.01); *H04N 1/00129* (2013.01); *H04N 5/23219* (2013.01); *G06K 9/00248* (2013.01); *G06K 9/00288* (2013.01); *G06K 9/00604* (2013.01)

(58) Field of Classification Search
CPC ........... H04N 1/00129; H04N 5/23219; H04N 5/23293; G06F 3/14; G06F 17/30256; G06F 17/3028; G06F 21/32
See application file for complete search history.

(56) References Cited

U.S. PATENT DOCUMENTS

| 7,221,865 | B2* | 5/2007 | Nonaka | G03B 17/24 348/231.3 |
| 8,928,583 | B2* | 1/2015 | Kogane | G09G 5/36 345/156 |
| 9,210,313 | B1* | 12/2015 | Svendsen | G06F 17/30244 |

(Continued)

OTHER PUBLICATIONS

2012 IEEE 11th International Conference on Trust, Security and Privacy in Computing and Communications. "Location-based Authentication and Authorization Using Smart Phones" by Feng Zhang et al. pp. 1285-1292.*

*Primary Examiner* — Daniel M Pasiewicz
(74) *Attorney, Agent, or Firm* — Eversheds Sutherland (US) LLP

(57) ABSTRACT

Systems, methods, and computer-readable media are disclosed for digital photo frames with personalized content. In one embodiment, an example device may include at least one memory that stores computer-executable instructions, and at least one processor configured to access the at least one memory and execute the computer-executable instructions to determine a human face in an ambient environment, determine a user identifier associated with the human face, and determine a database index comprising relationships between media content and user identifiers. The at least one processor may be configured to determine a set of media content available to the device, the set of media content comprising pre-indexed images and videos, determine first media content of the set of media content associated with the user identifier in the database index, and initiate presentation of the first media content at a display in the ambient environment.

19 Claims, 8 Drawing Sheets

(56) References Cited

U.S. PATENT DOCUMENTS

| | | | | |
|---|---|---|---|---|
| 2007/0033607 | A1* | 2/2007 | Bryan | H04H 60/27 725/10 |
| 2009/0315869 | A1* | 12/2009 | Sugihara | G06F 1/1605 345/204 |
| 2010/0124363 | A1* | 5/2010 | Ek | G06F 21/32 382/118 |
| 2010/0194906 | A1* | 8/2010 | In | G06K 9/00268 348/222.1 |
| 2010/0312833 | A1* | 12/2010 | Rimmer | G08B 21/0415 709/204 |
| 2011/0096094 | A1* | 4/2011 | Seol | H04N 5/765 345/634 |
| 2014/0003716 | A1* | 1/2014 | Fedorovskaya | G06K 9/00677 382/170 |
| 2014/0375558 | A1* | 12/2014 | Conness | H04N 5/60 345/156 |
| 2015/0154775 | A1* | 6/2015 | Tobita | G06T 11/60 345/619 |

* cited by examiner

DIGITAL PHOTO FRAMES WITH PERSONALIZED CONTENT

BACKGROUND

Digital devices may include displays used to present multimedia content, such as images and videos. Devices such as smartphones and tablets may, for example, present images and videos that a user captured with a smartphone or other device. In another example, a digital picture device may cycle through multiple image and video files, so as to allow users to view multiple images or videos as opposed to a static print or digital image. Users may therefore view more than one media file on a digital device display. However, users may desire to view or otherwise consume media, such as images, videos, and other media, that is relevant to the user.

Figure 1:
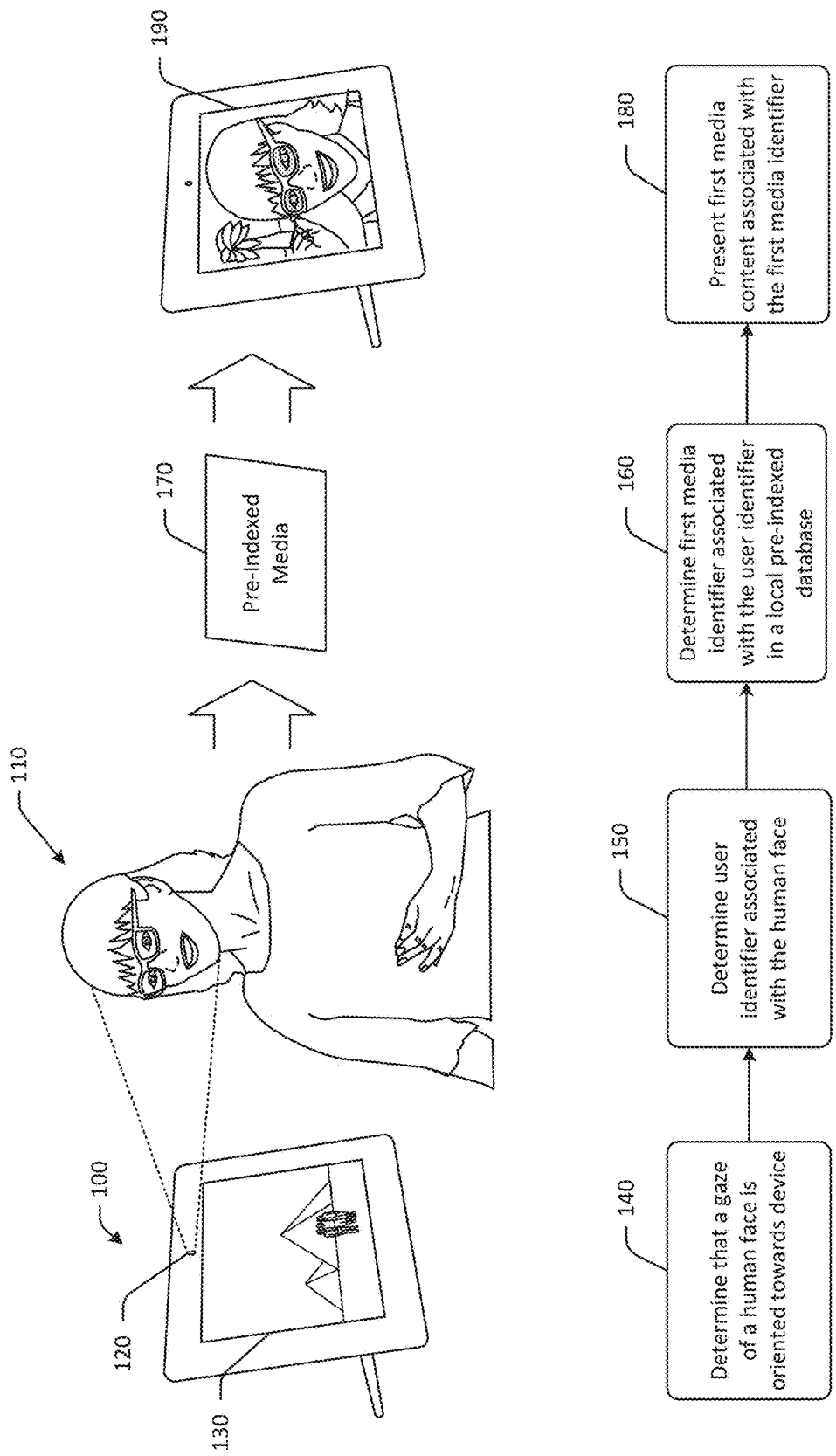
FIG. 1 is a hybrid system and process diagram illustrating personalized content being presented at digital displays in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may view or consume the digital content. Digital content may include, for example, media, images, videos, messages, text, and other content. Digital content may include images and videos captured by users or content generated by other sources. Digital content may be stored locally or may be received from another computer system. Users may desire to consume certain content or media on device displays. For example, users may desire to see pictures or videos that are relevant to the user, as opposed to pictures or videos that may not be relevant to the user. In one example, a user may desire to consume content related to the user's children on a device display, while another user may desire to consume content that includes the users, such as vacation pictures and the like. Certain embodiments of the disclosure may include electronic devices, such as digital photo frames, smartphones, tablets, and other computer systems that present personalized content to users.

Embodiments of the disclosure may determine or detect when one or more persons are looking at a device display. For example, a built-in camera may be used to view an ambient environment, and a computing system may determine whether any human faces are oriented towards the device display and/or whether a user's gaze is directed towards the device display. Certain embodiments may search a local or remote database to match a detected human face. If the detected human face is matched in the database, embodiments of the disclosure may identify content, such as images or videos, associated with the detected human face, and may cause presentation of the identified content at the device display that the user(s) is looking at. Certain embodiments may be configured to control presentation of content by, in one example, setting a percentage of content that includes the person or people looking at the device display. Certain embodiments may be controlled to present preselected people, such as family members, when another person, such as a parent, looks at the device display.

Embodiments of the disclosure may automatically determine and/or identify users that are in an ambient environment and/or looking at a device display, and may present content at the device display (as well as other related device displays) that is personalized for the identified user. For example, images or videos of the identified user, or of other people, such as the identified user's family, may be presented at the device display. In some embodiments, multiple users may be in the vicinity of a device display and/or looking at a device display. In such instances, content may be presented that is relevant to multiple users. For example, pictures and videos including some or all of the users may be presented. Certain users may be prioritized over other users, such as a user identified as an owner of the device display, or based at least in part on another factor. Personalized content for respective users may be identified based at least in part on pre-indexed media. Pre-indexed media may include images and videos that are scanned for faces and associated with facial identifiers in a database for faces occurring in the respective images and videos during indexing. The pre-indexed media database may be stored locally at a device that includes the display device in some embodiments, such as a digital photo frame. In other embodiments, the pre-indexed media database may be stored remotely. Based at least in part on the pre-indexed media database, personalized content can quickly be identified using detected facial identifiers, and presented at the display device. As new content, such as new images and videos, is received by the device, the new content may be scanned and indexed for later use, thereby reducing latency in presentation of personalized content.

This disclosure relates to, among other things, systems, methods, computer-readable media, techniques, and methodologies for presenting personalized content at digital displays. Embodiments may identify human or other faces (e.g., pets, etc.) gazing at a display device or otherwise in proximity to a display device. Media associated with the identified human or other face may be identified in a pre-indexed media database. The identified media may be presented at one or more display devices so as to present personalized content to the identified human or other face. The identified media may include the human or other face, other people associated with the identified face, such as friends and family members, or other content (e.g., pictures that were taken by the identified face, etc.). The identified media may be presented in any suitable format, such as a slideshow format, a random ordering of the identified content, or another format. As a result, relevant and personalized content may be dynamically presented to users at device displays.

Referring to FIG. 1, an example use case illustrating personalized content being presented at digital displays is depicted. A digital photo frame 100 may be in an ambient environment, such as in a home or office. The digital photo frame 100 may include one or more components, such as a camera 120, an optional motion sensor, a display 130, one or more memory devices, and/or one or more processors. The digital photo frame 100 may identify or detect faces, such as human or animal faces, in the ambient environment. In one example, the digital photo frame 100 may determine faces in the ambient environment using the camera 120. In some embodiments, the digital photo frame 100 may not only identify faces in the ambient environment, but may also determine whether any identified faces are oriented towards the digital photo frame 100, or whether a gaze of any detected face is towards the digital photo frame 100.

In the example of FIG. 1, a user 110 may be in the ambient environment of the digital photo frame 100. The digital photo frame 100 may use the camera 120 to detect the face of the user 110. FIG. 1 depicts an example process flow for presentation of personalized content in accordance with one or more embodiments of the disclosure. At a first operation 140, the digital photo frame 100 may optionally determine that a gaze of a human face is oriented towards the device, or the digital photo frame 100. For example, the digital photo frame 100 may determine that a user is present in the ambient environment via feedback from a motion sensor. The digital photo frame 100 may use one or more gaze detection algorithms to determine whether any eyes are directed towards the digital photo frame 100. In the example of FIG. 1, the digital photo frame 100 may determine that a gaze of the user 110 is oriented towards the digital photo frame 100. In other embodiments, the digital photo frame 100 may not use gaze detection, and may use facial recognition or other functionality to identify a user in the ambient environment. For example, a user device associated with a user may be detected and used to identify the user, the user's face may be detected and used to identify the user even though the user is not gazing at the digital photo frame 100, the user's profile appearance may be used to identify the user, and the like. In some embodiments, more than one functionality may be used to detect and identify users, such as facial recognition and gaze detection.

At a second operation 150, the digital photo frame 100 may determine a user identifier associated with the human face. In FIG. 1, the digital photo frame 100 may determine a user identifier associated with the human face of the user 110. The user identifier may be a unique facial identifier or other user identifier and may be based at least in part on unique facial characteristics of the user 110. The digital photo frame 100 may apply one or more facial recognition algorithms to any detected faces in the ambient environment, or may otherwise determine one or more facial identifiers or characteristics that may be unique to a detected face, such as the face of the user 110. In some embodiments, the digital photo frame 100 may communicate with one or more remote servers to identify or otherwise determine detected faces. Faces in the ambient environment may be detected and/or identified in realtime, or after the face is in the environment for a minimum length of time (e.g., 1 minute or another threshold of time).

At a third operation 160, the digital photo frame 100 may determine a first media identifier associated with the user identifier in a local pre-indexed database 170. The pre-indexed database 170 may be a database index including relationships between media content and user identifiers. The first media identifier may be associated with media such as an image or a video that is associated with the user identifier. For example, the first media identifier may be associated with an image of the user 110. In one embodiment, the first media identifier may be associated with the user identifier in a local pre-indexed database stored at the digital photo frame 100. The local pre-indexed database 170 may be stored at the digital photo frame 100 and may include links or pointers to digital content, such as images and/or videos, as well as associations with user identifiers and/or media identifiers that identify the respective digital content. Using the information in the local pre-indexed database 170, the digital photo frame 100 may identify media that is associated with, or otherwise relevant to, users in the ambient environment, such as the user 110. Pre-indexed content may allow the digital photo frame 100 to identify content relevant to a user, such as the user 110, with reduced latency, since the digital photo frame 100 may not have to identify relevant content in realtime.

In some embodiments, the digital photo frame 100 may determine a set of media content available to the digital photo frame 100. The set of media content may include pre-indexed images and videos or other digital content. The digital photo frame 100 may determine first media content of the set of media content associated with the user identifier in the database index.

At a fourth operation 180, the digital photo frame 100 may present first media content associated with the first media identifier. For example, the digital photo frame 100 may present an image 190 that includes the user 110 at the display 130 of the digital photo frame 100. Before the user 110 gazed at the digital photo frame 100, or before the user 110 was in the ambient environment of the digital photo frame 100, the digital photo frame 100 may have been presenting an image of another person, such as another person that is no longer gazing at the digital photo frame 100, with pyramids. After determining the first media associated with the user 110, the digital photo frame 100 may transition to the image 190 with the user 110. While the image 190 may include the user 110, other media presented at the display 130 may not include the user 110, but may still be associated with the user 110.

In the illustrated embodiment, the digital photo frame 100 may initiate presentation of the first media content at the display 130 in the ambient environment. In some embodiments, presentation of content at a display device in the ambient environment, such as the display 130, may be initiated or caused by one or more remote computers.

Multiple faces may be determined and/or detected and identified by the digital photo frame 100 or another device, such as a smartphone or a tablet, at the same time or at substantially the same time. For example, if there are multiple users in the ambient environment, the respective faces of the users may be detected and identified. The pre-indexed media database may be searched to determine whether there is any content associated with all of the identified users. If there is, the respective content may be presented. If there is not, then content including one or more of the identified users may be presented. In some embodiments, if there is less than a minimum threshold number of content pieces associated with multiple users, then the content associated with some of the multiple users may be randomly selected and presented, so as to present dynamic and relevant content at a display device. In certain embodiments, one or more users may be prioritized over others, such that if there are multiple users in the ambient environment, only content including the prioritized user, or content that is associated with the prioritized user (e.g., includes the prioritized user's family or friends, etc.), may be presented, or may be presented more often than content that is not associated with the prioritized user.

Embodiments of the disclosure may use location information of a display device to determine whether a detected user is authorized to consume certain content. For example, if the user 110 in FIG. 1 is at home, the user 110 may be authorized to consume content at the digital photo frame 100. If the user 110 was at another location, such as a friend's home to which she had not previously visited or been authorized at, the digital photo frame 100 may determine that the user 110 is not an authorized user, based at least in part on the physical geographic location of the display 130 of the digital photo frame 100, and may cease presentation of content, or may simply present default or non-personalized content.

In some embodiments, voice identification and timing features may be used to determine or identify users in an ambient environment. For example, voice data may be used to identify users by comparing captured voice data to a user profile. Similarly, timing patterns may be established over time to determine a likelihood that a certain user is in the ambient environment. For example, a user may get home at 6 pm daily. Therefore, a detection of a user at around 6 pm may likely be the user.

The systems, methods, computer-readable media, techniques, and methodologies for presenting personalized content at digital displays may detect and/or identify users in an ambient environment of a display device. Content associated with identified or determined users in the ambient environment of the display device may be determined and presented at one or more display devices in or near the ambient environment of the display device. Embodiments of the disclosure may therefore present relevant digital content to users and may restrict access to certain content based at least in part on identified users. In some embodiments, a detection of a user's gaze may be used to determine content to display on the display device.

Example embodiments of the disclosure provide a number of technical features or technical effects. For example, in accordance with example embodiments of the disclosure, certain embodiments of the disclosure may detect the presence of faces, such as human or animal faces, and may detect an orientation of faces and/or a direction of gaze. Embodiments of the disclosure may identify users in the ambient environment of a display device and may identify digital content associated with the identified users. The associated digital content may be presented at the display device and may be locally stored in a pre-indexed database, so as to reduce latency in presentation of content. The presented content may therefore be relevant and personalized to users in the ambient environment and/or users looking at one or more display devices. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
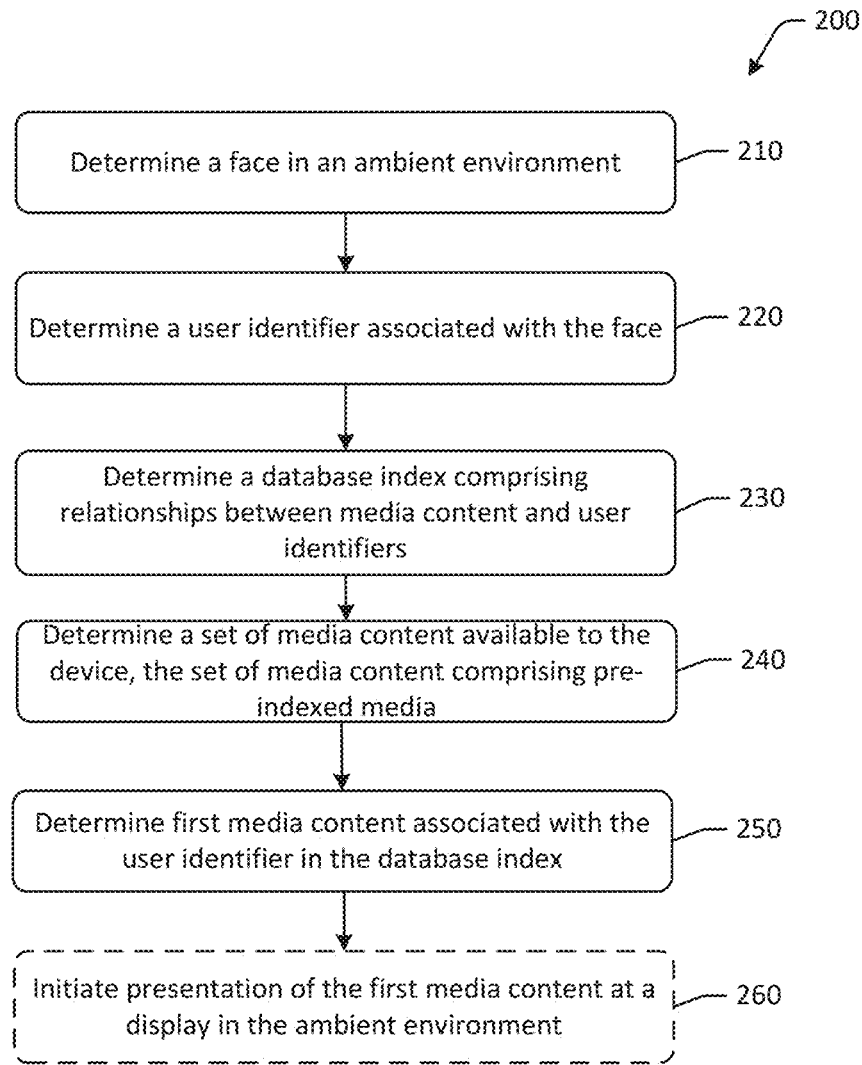
FIG. 2 is an example process flow diagram for presenting personalized content at digital displays in accordance with one or more embodiments of the disclosure.
Figure 3:
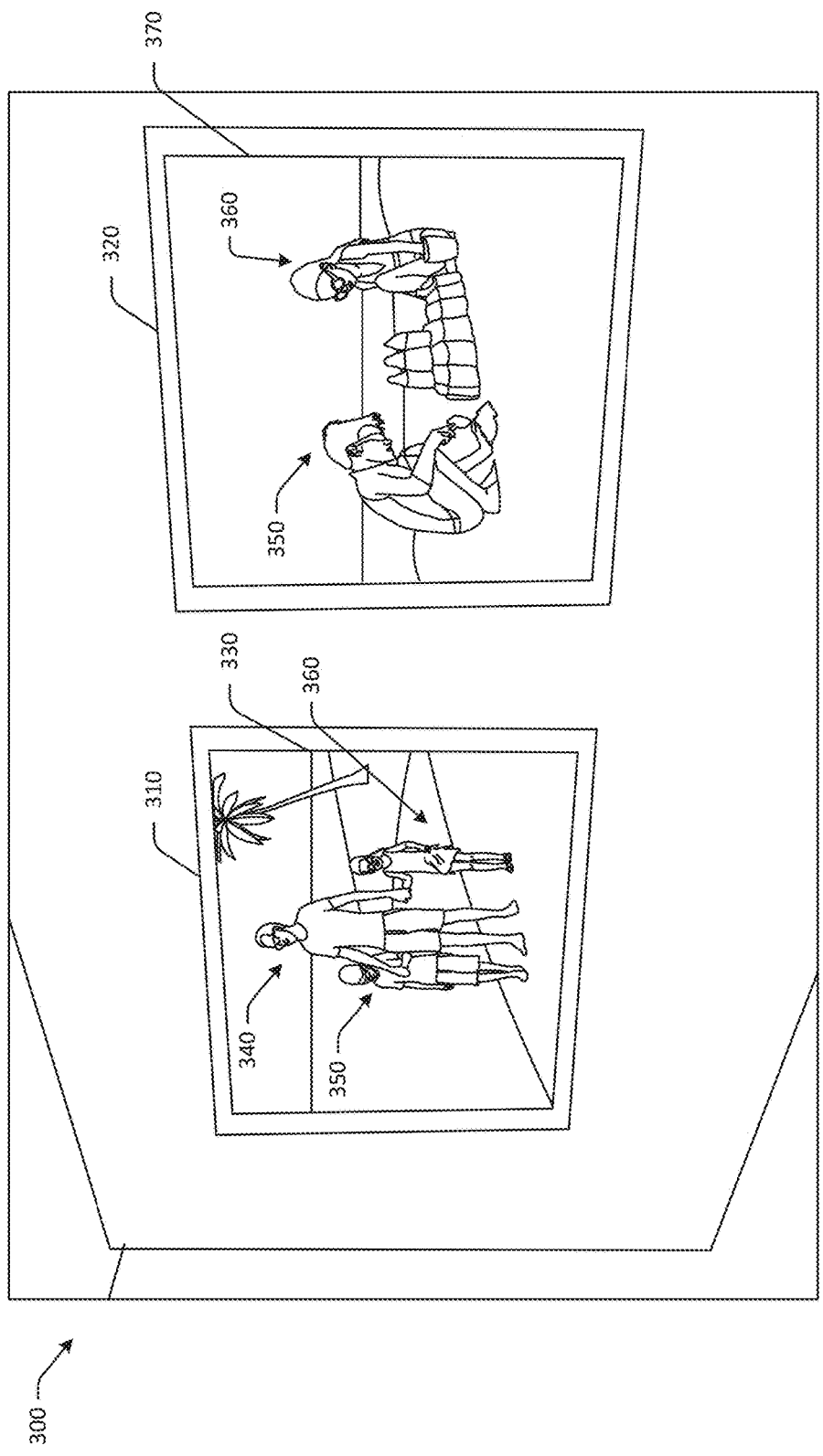
FIG. 3 is an example environment with digital photo frames presenting personalized content in accordance with one or more embodiments of the disclosure.

Referring to FIG. 2, an example process flow 200 for presenting personalized content at digital displays in accordance with one or more embodiments of the disclosure is depicted. Although certain operations are illustrated as occurring separately in FIG. 2, some or all of the operations may occur concurrently or partially concurrently across one or more computer systems. FIG. 3 depicts an example environment 300 with digital photo frames presenting personalized content in accordance with one or more embodiments of the disclosure and will be discussed in conjunction with FIG. 2.

At block 210 of the process flow 200, a face in an ambient environment may be determined. The ambient environment may be an ambient environment of a display device. The face may be a human face or an animal face. The face may be determined, in one embodiment, by using one or more cameras to view and/or capture faces present in the ambient environment. For example, computer-executable instructions of one or more facial detection module(s) stored locally at a device, such as a smartphone or a digital photo frame, or stored at a remote server, may be executed to determine a face in an ambient environment. Determining a face may include capturing an image of the face and identifying facial characteristics. Facial characteristics may be compared to pre-existing facial characteristic data or other user identifiers and/or facial identifier data to determine whether there is a match between a detected face and pre-existing facial characteristic data. In some embodiments, one or more facial identifiers or unique facial characteristics of a detected face may be determined. The facial identifiers may represent one or more geometric characteristics of a face, such as symmetry information, dimensions, and the like, as well as skin tone, hair and facial hair, and other identifiers that can be used to differentiate faces.

In some embodiments, determining a face in an ambient environment may be triggered based at least in part on feedback from one or more sensors. For example, feedback from a motion sensor may be used to trigger a camera in the ambient environment, so as to conserve energy by deactivating the camera when no motion is detected in the ambient environment.

In some embodiments, a determination may be made as to whether a determined face is oriented towards a display device, and/or whether a gaze of the face is oriented towards a display device. For example, a user may be in the ambient environment of a display device, but may not be looking at the display device. In certain instances, no content may be presented at the display device unless the user or determined face is oriented towards the display device. While a camera may be used to determine faces and/or orientations of faces, the camera may be positioned apart from the display device in the ambient environment. For example, the camera may be positioned separate from the display device, or the camera may be positioned adjacent to the display device.

At block 220 of the process flow 200, a user identifier associated with the face may be determined. The user identifier may be the facial identifier, or may be a unique user identifier associated with one or more facial characteristics. For example, each unique face may be associated with a user identifier and/or user profile. User information, such as content presentation settings, related people such as family and friends, locations associated with the user, authorization information, and other information may be associated with the user identifier. In one example, computer-executable instructions of one or more facial detection module(s) may be executed to determine a user identifier associated with a face. The face may be a face detected in the ambient environment. The user identifier may be locally available, for example, stored at a local database index in association with the facial identifier, or may be stored and accessible at a remote server. User identifiers may be associated with facial identifiers or facial characteristics, and may be stored at a local database index in association with the facial identifiers or facial characteristics.

At block 230 of the process flow 200, a database index comprising relationships between media content and user identifiers may be determined. For example, computer-executable instructions of one or more media identification and sequencing module(s) may be executed to determine a database index that comprises relationships between media content and user identifiers. The database index may be a pre-indexed media database that includes links or associations between user identifiers and media content identifiers. The database index may be pre-indexed or matched with media identifiers and user identifiers, so as to reduce latency. As new media content becomes available to the device (e.g., a user takes new pictures with a smartphone or uploads content to a server, etc.), the newly available media content may be scanned and associated with user identifiers. The relationships may then be stored in the pre-indexed media database. For example, each media file, such as images and videos, may be associated with a media identifier. The respective media identifier may be associated with one or more user identifiers. In some embodiments, the respective media identifiers may be associated with user identifiers of users that are featured or included in the respective media file. The media identifiers may be associated with related user identifiers of users that are featured or included in the respective media file. For example, if an image file includes two children, the image file may be associated with the user identifiers of the two children, as well as the user identifiers of one or both of the parents of the children. In some embodiments, user identifiers may not be associated with media identifiers of media that they are featured in. For example, a user may select a setting that indicates the user does not want to see media of himself or herself, and as a result, although the user may be identified in certain media, that media may not be associated with the user, or may be associated with the user but not presented to the user.

At block 240 of the process flow 200, a set of media content available to the device may be determined, where the set of media content comprises pre-indexed media, such as images and videos. For example, computer-executable instructions of one or more media identification and sequencing module(s) may be executed to determine media content that is available. The available media content may be content that is stored locally, or media content that is stored remotely and is accessible by a device (e.g., the device is authorized to access the remote media, etc.). The media content may be media files associated with respective media identifiers. One or more, or each, of the media content may be associated with one or more user identifiers, based at least in part on the particular contents (e.g., people or pets featured in the content, etc.) of the media content, user preferences, display or presentation settings, and the like.

At block 250 of the process flow 200, first media content associated with the user identifier in the database index may be determined. The first media content may be selected from the set of available media content and may be, for example, an image or a video. In one example, computer-executable instructions of one or more media identification and sequencing module(s) may be executed to determine or identify first media content associated with the user identifier in the database index. The one or more media identification and sequencing module(s) may be executed to identify the user identifier and associated media content, and may select one of the associated media content as the first media content. The first media content may be randomly selected, or may be selected based at least in part on one or more criteria, such as time elapsed since the last time a media content was presented, whether or not a media content is a "favorite" or "liked" media content, and other criteria.

In some embodiments, some or all of the media content associated with the user identifier may be sequenced for presentation. For example, one or more media identification and sequencing module(s) may be executed to generate a sequence of some or all of the media content associated with a detected user. Sequencing may be based at least in part on user settings or preferences, and may include factors such as a total number of media content associated with the user identifier, whether other users are detected in the ambient environment, how recent the media content was captured, and other factors.

At optional block 260 of the process flow 200, presentation of the first media content at a display in the ambient environment may be initiated. In one example, computer-executable instructions of one or more media identification and sequencing module(s) may be executed to initiate presentation of the first media content at a display in the ambient environment. In some embodiments, presentation may be controlled or initiated locally, for example, at a device local to the display, while in other embodiments, presentation may be controlled or initiated by a remote server. The first media content may be presented at a display device in the ambient environment where the face was detected, and the user in the ambient environment may therefore consume personalized content at the display device.

Referring to FIG. 3, the example ambient environment 300 is depicted. The ambient environment 300 may be a home or another location. Embodiments of the disclosure may include a plurality of display devices configured to present personalized content simultaneously. In FIG. 3, the ambient environment 300 may include a first digital photo frame 310 and a second digital photo frame 320 that are mounted on a wall. One or more users may be detected in the ambient environment 300, for example, using a camera. The one or more users may be in the same room as the first digital photo frame 310 and the second digital photo frame 320, or may be elsewhere in the home. For example, the one or more users may be in the living room adjacent to a hallway where the first digital photo frame 310 and the second digital photo frame 320 are mounted. A camera used to detect the one or more users may be separate from the first digital photo frame 310 and the second digital photo frame 320, or may be adjacent to or integrated with the first digital photo frame 310 and the second digital photo frame 320.

In the example of FIG. 3, there may be a plurality of users detected in the ambient environment 300. For example, a dad 340 and his child 350 may be detected and identified in the ambient environment 300. As a result, media content associated with both the dad 340 and the child 350 may be identified in a pre-indexed media database for presentation at the first digital photo frame 310 and the second digital photo frame 320. The appropriate media content may be identified, and presentation of the relevant media content may be coordinated between the first digital photo frame 310 and the second digital photo frame 320. For example, first media content 330 may be presented at the first digital photo frame 310, and second media content 370 that is different than the first media content 330 may be presented at the second digital photo frame 320. The first media content 330 may include an image of the dad 340, the child 350, and a second child 360, while the second media content 370 may include the child 350 and the second child 360, without the dad 340.

The second media content 370 may be selected for presentation to the dad 340 because of a user setting. For example, the dad 340 may have a user profile in which he indicated that he would like to see media content associated with not only himself, but also any media content associated with one or both of the child 350 and the second child 360. In some embodiments, users may prefer not to see any media content that includes themselves (e.g., the dad may wish to see only pictures of his kids, etc.), and may indicate such preferences in user settings.

Presentation of the media content at the first digital photo frame 310 and the second digital photo frame 320 may be controlled via individual controllers at the first digital photo frame 310 and the second digital photo frame 320 that are in communication with each other, or may be managed by a central remote controller that may control presentation across one or more display devices in the ambient environment 300.

In instances where more than one user may be detected in the ambient environment, certain embodiments may identify some or all of the users in the ambient environment and/or some or all of the users looking at a particular display device. For example, in FIG. 3, the presence of a second human or animal face in the ambient environment 300 may be detected. The dad 340 may have been looking at a display device first, and the child 350 may have joined second. A second facial identifier of the second face, or the face of the child 350, may be determined. A second user identifier associated with the second facial identifier may be determined. The second user identifier may be used in conjunction with the first facial identifier, or the facial identifier of the dad 340, to determine whether there is any pre-indexed media content associated with both the first user identifier and the second user identifier. In some instances, user settings may be identified, based at least in part on the user identifier, to determine any other relevant user identifiers (e.g., the user identifier of the second child 360 based on the dad's profile settings, etc.) that may be used to identify relevant media content. Media content may be identified that is associated with one or both of the first user identifier and the second user identifier, and/or any other user identifiers associated with one or both of the first user identifier and the second user identifier. The identified media content may be presented at one or more display devices in the ambient environment 300 in any suitable sequence and format.

When a plurality of users is detected, one or more users may be prioritized over other users. As a result, that user's settings may be applied to presentation of content, and media associated with a prioritized user may be featured more frequently than other users. For example, content associated with a prioritized user may be presented more frequently than content associated with a second user that is not prioritized. Users may be prioritized based at least in part on location, ownership of a display, or other settings.

Figure 4:
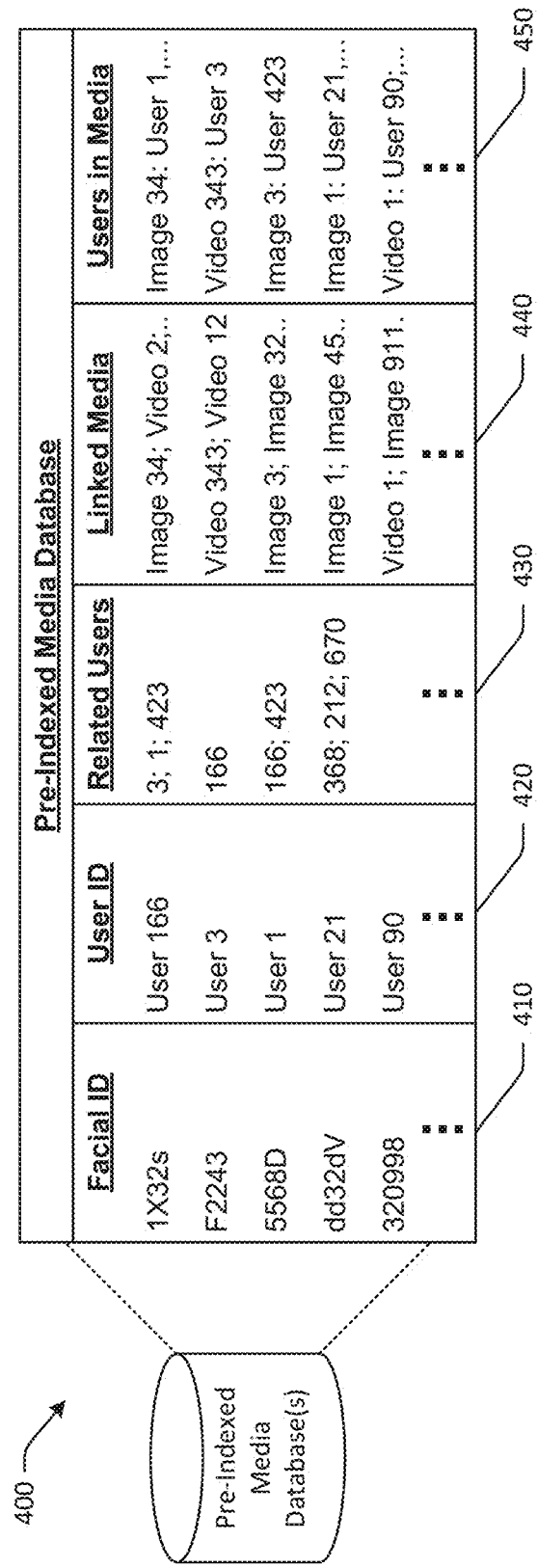
FIG. 4 is an example pre-indexed media database in accordance with one or more embodiments of the disclosure.

FIG. 4 depicts an example pre-indexed media database(s) 400 in accordance with one or more embodiments of the disclosure. The pre-indexed media database(s) 400 may include one or more database indexes that may include links or relationships between faces and media content. In some embodiments, faces may be linked to user identifiers, and user identifiers may be linked to media content. Relationships established in the pre-indexed media database 400 may be based at least in part on faces that appear in particular media content, and/or based at least in part on user settings or associations with other users, such as friends and family.

For example, the pre-indexed media database 400 may include facial identifier data 410. The facial identifier data 410 may be a unique identifier associated with a particular face. For example, the facial identifier data 410 may be an alphanumeric value assigned to one or more geometric patterns of a particular face. The pre-indexed media database 400 may include user identifier data 420. The user identifier data 420 may be associated with respective facial identifier data 410. The user identifier data 420 may be associated with a user profile, one or more settings, such as presentation settings, related user information, and the like. The pre-indexed media database 400 may include related user data 430. The related user data 430 may be associated with one or both of the facial identifier data 410 and the user identifier data 420. The related user data 430 may include users that are related to a particular user. For example, a user profile for User 166 may indicate that Users 3, 1, and 423 are related to User 166. User 166 may therefore be linked with Users 3, 1, and 423 in the pre-indexed media database 400. The pre-indexed media database 400 may include linked media data 440, which may include media content identifiers for media content associated with one or more of the facial identifier data 410, the user identifier data 420, or the related user data 430. The linked media data 440 may be used to identify media content for presentation to detected users. The pre-indexed media database 400 may include media/user data 450, which may indicate one or more user identifiers for users featured or otherwise depicted in respective media content. In some embodiments, the media/user data 450 may include one or more links between media content and facial identifier data 410, the user identifier data 420, and/or the related user data 430. The media/user data 450 may be used to identify media content for presentation to detected users.

Figure 5:
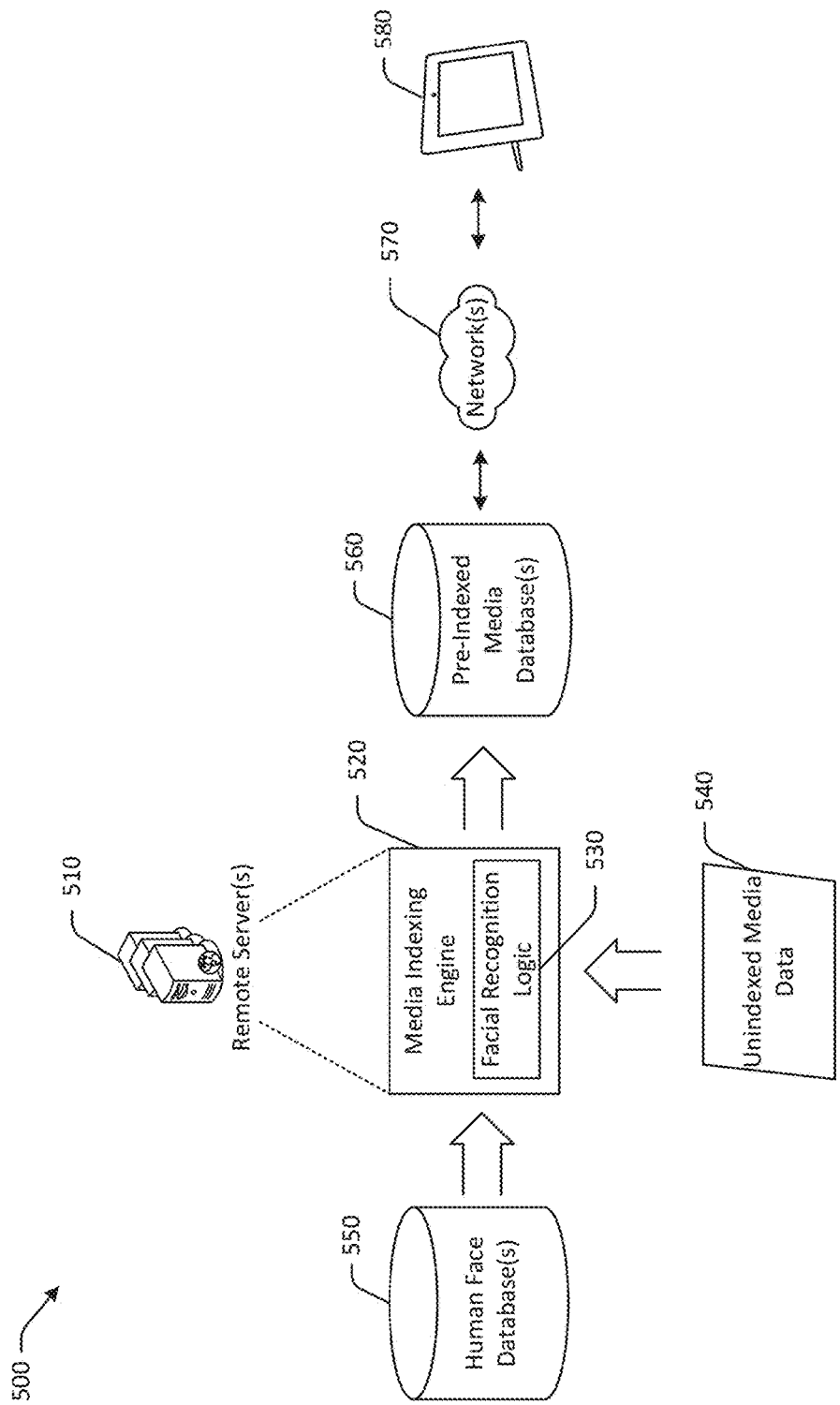
FIG. 5 is an example hybrid system and process flow diagram for presenting personalized content at digital displays in accordance with one or more embodiments of the disclosure.

FIG. 5 depicts an example hybrid system and process flow diagram 500 for presenting personalized content at digital displays in accordance with one or more embodiments of the disclosure. In FIG. 5, one or more remote servers 510 may include a media indexing engine 520. In some embodiments, the media indexing engine 520 may be stored at a local device instead of at the remote server 510. The media indexing engine 520 may be configured to index media content and store indexed media content data in a pre-indexed media database. For example, the media indexing engine 520 may include computer-executable instructions to scan media content and determine facial identifiers of faces that appear in the media content. The media indexing engine 520 may include facial recognition logic 530 that may be implemented to use pattern recognition or other facial detection algorithms to identify faces appearing in media content.

The media indexing engine 520 may receive unindexed media data 540. For example, when a user captures an image or a video with a smartphone, the captured media may be sent to the media indexing engine 520. The media indexing engine 520 may determine that the received media content is unindexed. The media indexing engine 520 may scan the media content using, for example, the facial recognition logic 530 to detect faces occurring in the media content. The media indexing engine 520 may determine that a first human face is present in the media content, based at least in part on the facial recognition logic 530. The media indexing engine 520 may access one or more human face databases 550 to determine whether there is a match between the detected first human face and any human faces in the human face database 550. For example, the media indexing engine 520 may compare facial identifier data of the first human face to facial identifier data in the human face database 550. If there is a match or a substantial match, the media indexing engine 520 may associate the media content with the matched facial identifier and/or user identifier in the pre-indexed media database. If there is no match, the media indexing engine 520 may generate a new facial identifier for the first human face and generate a new entry in the pre-indexed media database that associates the media content with the new facial identifier.

The media indexing engine 520 may output the identified user identifier and/or facial identifier and the media content identifier of the unindexed media data 540 to one or more pre-indexed media databases 560. The pre-indexed media database 560 may be available at a local device or may be stored at the remote server 510. In the illustrated embodiment, the pre-indexed media database 560 may be communicated to one or more devices, such as a digital photo frame 580, via one or more networks 570. The pre-indexed media database 560 may be periodically updated or updated as new media content becomes available. The pre-indexed media database 560 may be used to determine media content for presentation at a local device.

Figure 6:
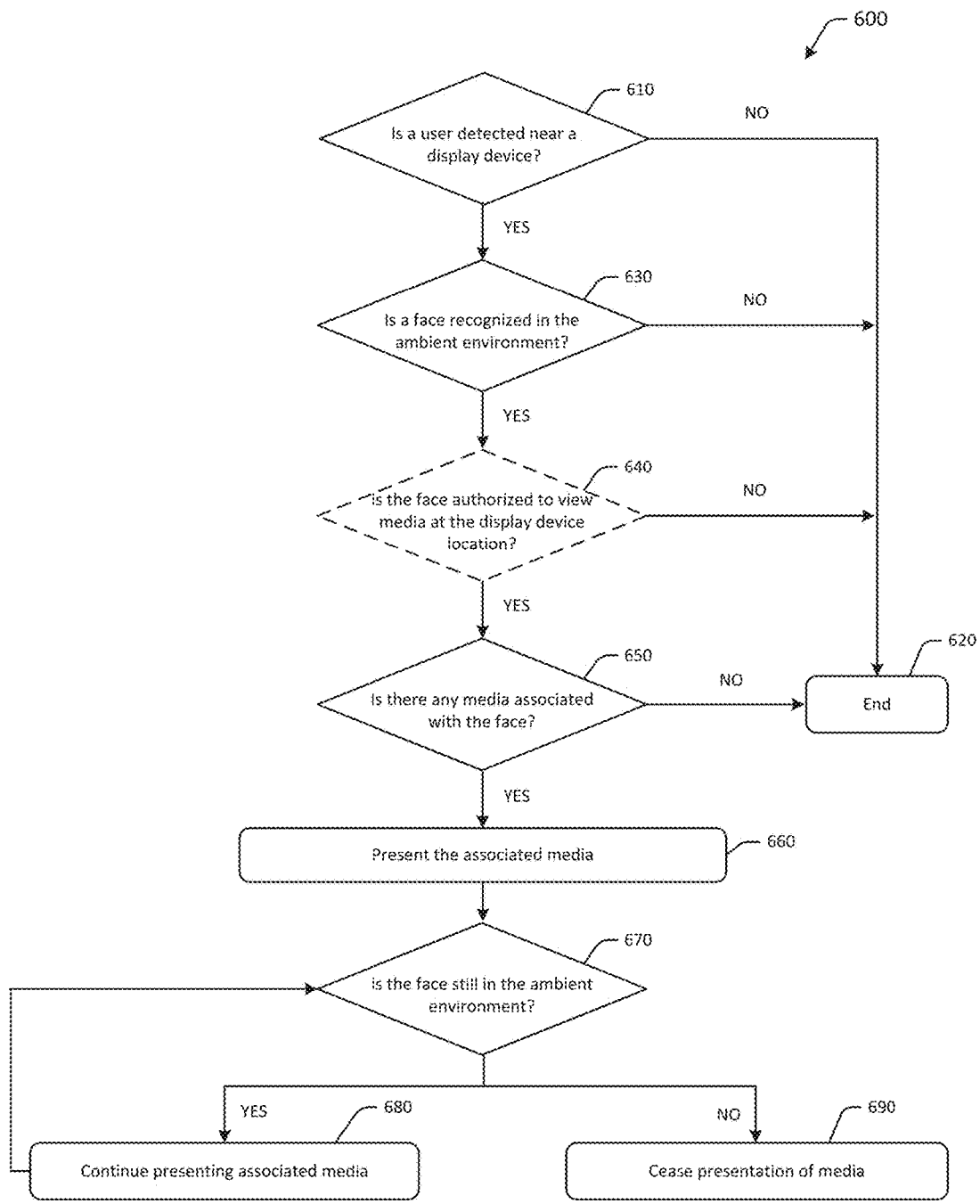
FIG. 6 is an example process flow diagram for presenting personalized content at digital displays in accordance with one or more embodiments of the disclosure.

FIG. 6 depicts an example process flow 600 for presenting personalized content at digital displays in accordance with one or more embodiments of the disclosure. At a first determination block 610, a determination is made as to whether a user is detected near a display device. For example, feedback from a motion sensor, an ambient light sensor, or another sensor may be used to determine whether a user is detected near a display device. If it is determined that no user is detected near a display device, the process flow 600 may end at block 620.

If it is determined, at the first determination block 610, that a user is detected near a display device, the process flow 600 may proceed to a second determination block 630. In some embodiments, a camera may be triggered after a user is detected. At the second determination block 630, a determination is made as to whether a face in the ambient environment is recognized. For example, computer-executable instructions of one or more facial detection module(s) may be executed to identify or otherwise determine one or more faces in the ambient environment. If it is determined that no face is recognized in the ambient environment, the process flow 600 may end at block 620.

If it is determined, at the second determination block 630, that a face is recognized in the ambient environment, the process flow 600 may proceed to optional determination block 640, at which a determination is made as to whether the face is authorized to consume or view media at the display device location. For example, computer-executable instructions of one or more location determination module(s) may be executed to determine whether a facial identifier or a user identifier is associated with a location of the display device. For example, if the display device is at a user's home, the user identifier of the user may be authorized to consume content at the display device. If the display device is at another location, such as a friend's house where the user has not previously been authorized to consume content, the user identifier of the user may not be authorized to consume content at the display device. If it is determined that the face and/or a user identifier associated with the face is not authorized to consume content at determination block 640, the process flow 600 may end at block 620. In some embodiments, presentation of any personalized content may cease at the display device after detection of the unauthorized user. In other embodiments, default or unrestricted content may be presented at the display device after detection of the unauthorized user. Unrestricted content may be content that does not include any human faces or content that has not been marked or identified as private or restricted. In some embodiments, access to certain content may be prevented through one or more privacy settings, so as to avoid presenting content that may be associated with one user to other users, even if the user in the content is in the ambient environment. In another example, certain content may be restricted or presentation of certain content may cease upon detecting an unauthorized user. For example, a certain image may be marked as "Family Only" and may only be presented when the detected users are either family members or otherwise authorized to consume the image. If a non-family member were to be detected, the image may no longer be presented.

Authorization may be based at least in part on a location of the display device. Some embodiments may determine a location of the display, and determine that the user identifier is associated with the location or the display itself, in which case the user may be authorized.

If it is determined at determination block 640 that the face or a user identifier associated with the face is an authorized user of the digital photo frame, the process flow 600 may continue to a fourth determination block 650. At the fourth determination block 650, a determination may be made as to whether there is any media associated with the face and/or a user identifier associated with the face. For example, computer-executable instructions of one or more media identification and sequencing module(s) may be executed to determine whether any media is associated with detected faces or users. If it is determined at determination block 650 that there is no media associated with the face or the user, the process flow may end at block 620, and/or default or unrestricted content may be presented.

If it is determined at determination block 650 that there is media associated with the face and/or the user, the process flow 600 may proceed to block 660, at which the associated media is presented at the display device in the ambient environment. Presentation of the media may include sequencing and randomized ordering. Selection of media for presentation may be based at least in part on a percentage of content that users desire to see of themselves and/or other related users. Selection of media may also be based at least in part on a time of day, a date, a season, a certain occasion, such as a birthday, an event, or other factors. For example, Christmas pictures from a previous Christmas may be presented in December, while birthday pictures from a previous birthday may be presented for a certain user's birthday. In another example, during or near the date of the Super Bowl, football related images, if available, may be presented.

At determination block 670, a determination is made as to whether the face or the user is still in the ambient environment. The determination may be based at least in part on camera feedback, and/or feedback from another sensor, such as a motion sensor. If it is determined that the face or the user is still present, the process flow 600 may proceed to block 680, at which presentation of the associated media continues. The process flow 600 may then return to determination block 670. The iterative process may continue until the user leaves the ambient environment, another user is detected, or until another change occurs in the ambient environment.

If it is determined at determination block 670 that the user is no longer in the ambient environment, the process flow 600 may proceed to block 690, at which presentation of the associated media is ceased. The display device may be powered off or may begin presentation of default or unrestricted media. In some embodiments, presentation of content may timeout automatically, if all associated content has been presented, or if a predetermined length of time or time interval has elapsed.

Figure 7:
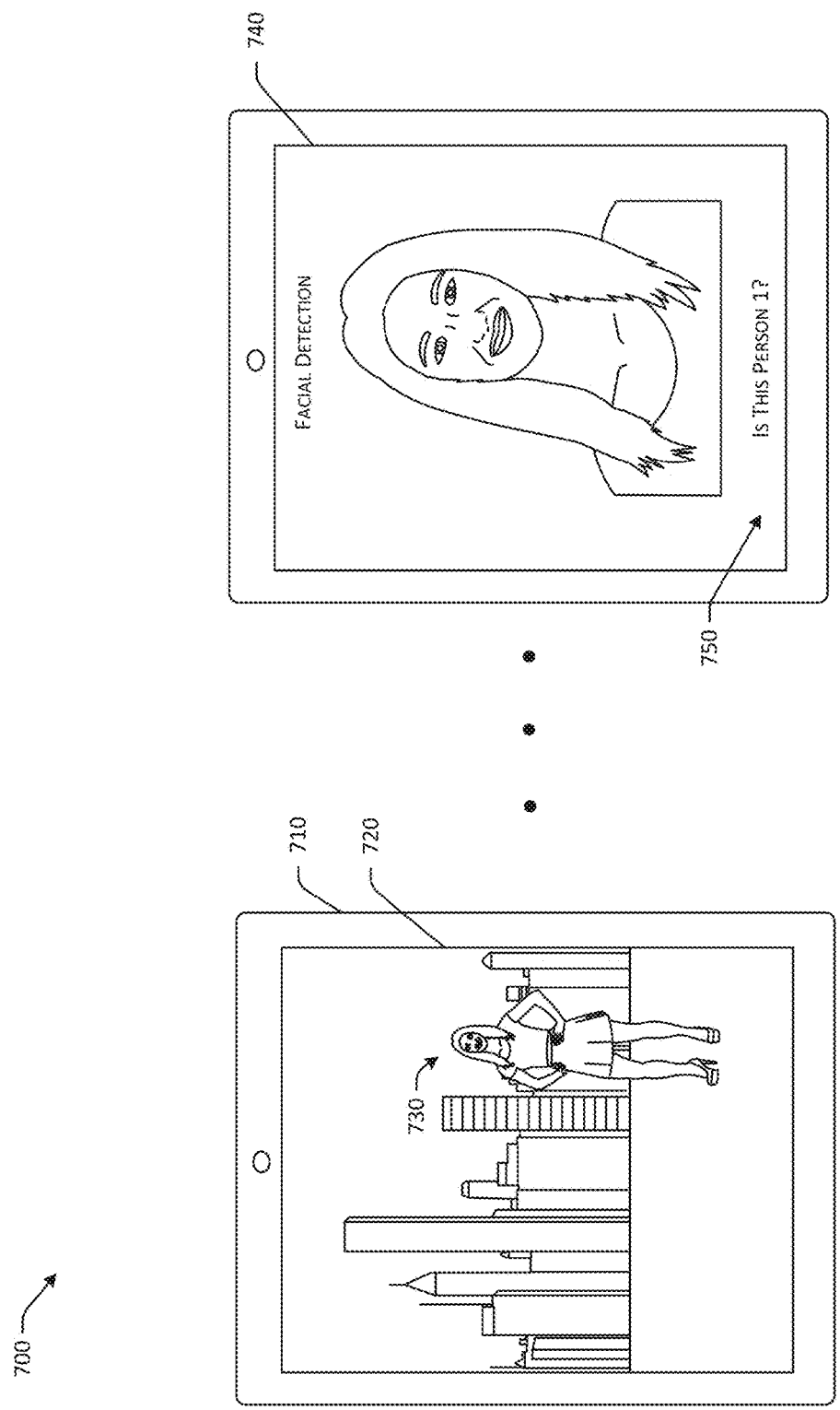
FIG. 7 depicts example user interfaces for identifying human faces in accordance with one or more embodiments of the disclosure.

FIG. 7 depicts example user interfaces 700 for identifying human faces in accordance with one or more embodiments of the disclosure. In FIG. 7, a first user interface 710 illustrates a first image 720 with a first user 730. The first image 720 may be scanned with a facial detection algorithm to identify a face of the first user 730. At a second user interface 740, the detected face may be a new face or may not be associated with a facial identifier or a user identifier in a pre-indexed media database. The second user interface 740 may present the detected face of the first user 730 and request manual input 750 regarding confirmation of who the face is associated with, or may request manual approval of creating a new facial identifier and/or user identifier in the pre-indexed media database. In some embodiments, this process may be completed automatically without manual input. In some embodiments, a display of a user device such as that shown in FIG. 7 may be used to present personalized content in accordance with embodiments of this disclosure.

One or more operations of the method, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
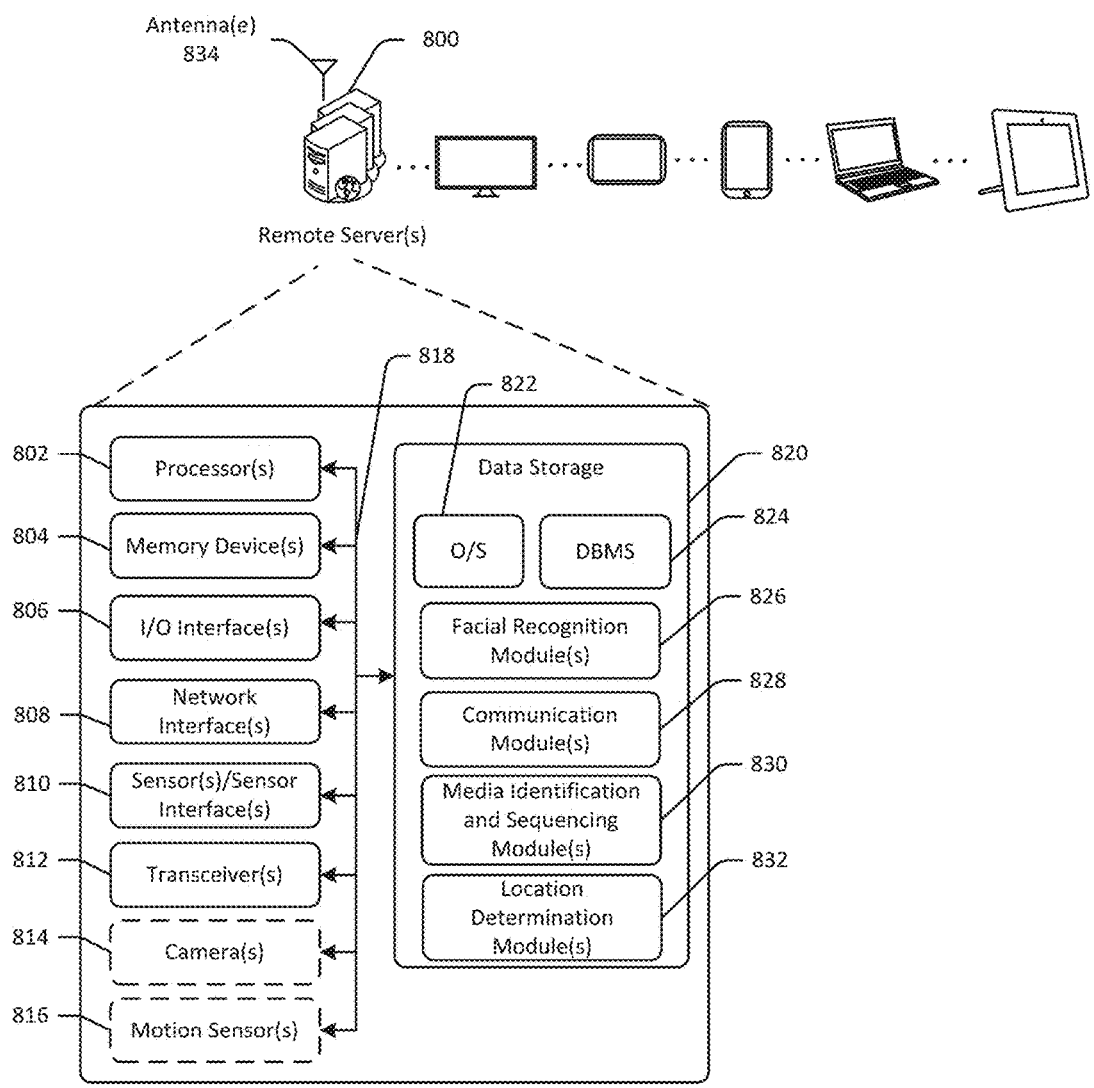
FIG. 8 schematically illustrates an example architecture of a computer system in accordance with one or more embodiments of the disclosure.

FIG. 8 is a schematic block diagram of one or more illustrative remote server(s) 800 in accordance with one or more example embodiments of the disclosure. The remote server(s) 800 may include any suitable computing device including, but not limited to, a server system, a mobile device such as a smartphone, a tablet, an e-reader, a wearable device, or the like; a desktop computer; a laptop computer; a content streaming device; a set-top box; or the like; a digital picture frame or other device; and the like. The remote server(s) 800 may correspond to an illustrative device configuration for the content management servers of FIGS. 1-7.

The remote server(s) 800 may be configured to communicate via one or more networks with one or more servers, user devices, or the like. The remote server(s) 800 may be configured to actively or passively initiate and/or manage selection and/or presentation of media at one or more devices. The remote server(s) 800 may be configured to deliver, select, identify, and/or present one or more pieces of content. In some embodiments, a single remote server or a single group of remote servers may be configured to perform more than one type of content-related functionality.

The remote server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 800 may include one or more processors (processor(s)) 802, one or more memory devices 804 (generically referred to herein as memory 804), one or more input/output ("I/O") interface(s) 806, one or more network interface(s) 808, one or more sensors or sensor interface(s) 810, one or more transceivers 812, one or more optional cameras 814, one or more optional motion sensors 816, and data storage 820. The remote server(s) 800 may further include one or more buses 818 that functionally couple various components of the remote server(s) 800. The remote server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the remote server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the remote server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to data storage 820 for non-volatile storage.

More specifically, the data storage 820 may store one or more operating systems (O/S) 822; one or more database management systems (DBMSs) 824; and one or more program module(s), applications, engines, computer-executable code, scripts, or the like such as, for example, one or more facial recognition module(s) 826, one or more communication module(s) 828, one or more media identification and sequencing module(s) 830, and/or one or more location determination module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to corresponding components in this disclosure.

The data storage 820 may further store various types of data utilized by components of the remote server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute computer-executable instructions loaded therein. For example, the processor(s) 802 may be configured to execute computer-executable instructions of the various program module(s), applications, engines, or the like of the remote server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to the functionality supported by the various program module(s) depicted in FIG. 8, the facial recognition module(s) 826 may include computer-executable instructions, code, or the like that responsive to execution by one or more of the processor(s) 802 may perform functions including, but not limited to, identifying certain patterns or images, such as human faces, implementing facial recognition algorithms, classifying patterns or images, detecting faces, performing facial recognition operations, identifying users, identifying user profiles associated with faces, determining whether a user is still gazing at a device, and the like.

The communication module(s) 828 may include computer-executable instructions, code, or the like that responsive to execution by one or more of the processor(s) 802 may perform functions including, but not limited to, communicating with remote servers, communicating with remote datastores, communicating with other electronic devices, sending or receiving notifications, and the like.

The media identification and sequencing module(s) 830 may include computer-executable instructions, code, or the like that responsive to execution by one or more of the processor(s) 802 may perform functions including, but not limited to, identifying media associated with user profiles and/or human faces, determining a sequence of available media to present, tracking a number of instances certain media has been presented, determining whether a user is authorized to consume certain content, and the like.

The location determination module(s) 832 may include computer-executable instructions, code, or the like that responsive to execution by one or more of the processor(s) 802 may perform functions including, but not limited to, determining a location associated with a device and/or a user, determining whether the user is authorized to consume content at the location, determining users associated with a particular location and/or device, and the like.

Referring now to other illustrative components depicted as being stored in the data storage 820, the 0/S 822 may be loaded from the data storage 820 into the memory 804 and may provide an interface between other application software executing on the remote server(s) 800 and hardware resources of the remote server(s) 800. More specifically, the 0/S 822 may include a set of computer-executable instructions for managing hardware resources of the remote server(s) 800 and for providing common services to other application programs (e.g., managing memory allocation among various application programs). In certain example embodiments, the 0/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 800 is a mobile device, the DBMS 824 may be any suitable light-weight DBMS optimized for performance on a mobile device.

Referring now to other illustrative components of the remote server(s) 800, the input/output (I/O) interface(s) 806 may facilitate the receipt of input information by the remote server(s) 800 from one or more I/O devices as well as the output of information from the remote server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The remote server(s) 800 may further include one or more network interface(s) 808 via which the remote server(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna (e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 1002.11 family of standards, including via 2.4 GHz channels (e.g., 1002.11b, 1002.11g, 1002.11n), 5 GHz channels (e.g., 1002.11n, 1002.11ac), or 60 GHz channels (e.g., 1002.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the remote server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the remote server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The camera(s) 814 may be any device configured to produce images and/or video or other digital content representing an ambient environment. The motion sensor(s) 816 may be any device configured to detect motion in an ambient environment of the sensor.

It should be appreciated that the program module(s), applications, computer-executable instructions, code, or the like depicted in FIG. 8 as being stored in the data storage 820 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the remote server(s) 800 may include alternate and/or additional hardware, software, or firmware components beyond those described or depicted without departing from the scope of the disclosure. More particularly, it should be appreciated that software, firmware, or hardware components depicted as forming part of the remote server(s) 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A digital photo frame comprising:
    a camera;
    a motion sensor;
    a display;
    at least one memory that stores computer-executable instructions; and
    at least one processor configured to access the at least one memory and execute the computer-executable instructions to:
        detect, using the motion sensor, motion in an ambient environment;
        initiate the camera after detecting the motion;
        detect, using the camera, presence of a human face in an ambient environment;
        determine that a gaze of the human face is oriented towards the digital photo frame;
        determine a facial identifier of the human face, the facial identifier representing a geometric characteristic of the human face;
        determine a user identifier associated with the facial identifier, wherein the user identifier is stored at a local database index in association with the facial identifier;
        determine a location associated with the display, wherein the location is static;
        determine that the user identifier is associated with the location of the display;
        determine that the user identifier is an authorized user of the digital photo frame;
        determine a set of local pre-indexed images that the user identifier is authorized to view;
        determine a first image identifier of the pre-indexed images linked to the user identifier in the database index; and
        present a first image associated with the first image identifier at the display.

2. The digital photo frame of claim 1, wherein the human face is a first human face, the facial identifier is a first facial identifier, and the user identifier is a first user identifier, and wherein the at least one processor is further configured to access the at least one memory and execute the computer-executable instructions to:
    detect presence of a second human face in the ambient environment;
    determine a second facial identifier of the second human face;
    determine a second user identifier associated with the second facial identifier;
    determine a second image identifier linked to the first user identifier and the second user identifier; and
    present a second image associated with the second image identifier at the display.

3. The digital photo frame of claim 1, wherein the human face is a first human face and the user identifier is a first user identifier, and wherein the at least one processor is further configured to access the at least one memory and execute the computer-executable instructions to:
    determine that the first user identifier is associated with a second user identifier and a second human face;
    determine a second image identifier linked to the second user identifier; and
    present a second image associated with the second image identifier at the display, wherein the second image comprises the second human face and does not comprise the first human face.

4. A device comprising:
    at least one memory that stores computer-executable instructions; and
    at least one processor configured to access the at least one memory and execute the computer-executable instructions to:
        determine a human face in an ambient environment;
        determine a user identifier associated with the human face;
        determine a database index comprising relationships between media content and user identifiers;
        determine a location associated with a display, wherein the location is static;
        determine that the user identifier is associated with the location of the display;
        determine a set of media content that is available to the device and for which the user identifier is authorized to access, the set of media content comprising pre-indexed images and videos;

determine first media content of the set of media content associated with the user identifier in the database index; and initiate presentation of the first media content at the display in the ambient environment.

5. The device of claim 4, wherein the at least one processor is further configured to access the at least one memory and execute the computer-executable instructions to:

determine that third media content is unindexed;

scan the third media content using a face detection algorithm;

determine a first human face present in the third media content;

determine that the first human face is associated with a first user identifier; and associate the third media content and the first user identifier in the database index.

6. The device of claim 4, wherein the at least one processor is further configured to access the at least one memory and execute the computer-executable instructions to:

determine second media content of the set of media content associated with the user identifier;

initiate presentation of the second media content after the first media content at the display;

determine that a predetermined time interval has elapsed; and cease presentation of the first media content and the second media content.

7. The device of claim 4, wherein the human face is a first human face and the user identifier is a first user identifier, and wherein the at least one processor is further configured to access the at least one memory and execute the computer-executable instructions to:

determine a second human face in the ambient environment;

determine a second user identifier associated with the second human face;

determine second media content of the set of media content, wherein the second media content is associated with the first user identifier or the second user identifier; and initiate presentation of the second media content at the display.

8. The device of claim 7, wherein the first media content is not associated with the second user identifier, and wherein the at least one processor is further configured to access the at least one memory and execute the computer-executable instructions to:

cease presentation of the first media content after determining the second human face.

9. The device of claim 4, wherein the human face is a first human face and the user identifier is a first user identifier, and wherein the at least one processor is further configured to access the at least one memory and execute the computer-executable instructions to:

determine a second human face in the ambient environment;

determine a second user identifier associated with the second human face; and determine that the first user identifier is prioritized over the second user identifier.

10. The device of claim 4, wherein the at least one processor is further configured to access the at least one memory and execute the computer-executable instructions to:

determine that second media content of the set of media content is not associated with the user identifier; and prevent access to the second media content.

11. The device of claim 4, wherein the first media content comprises an image of the human face.

12. The device of claim 4, wherein the at least one processor is further configured to access the at least one memory and execute the computer-executable instructions to:

determine that a gaze of the human face is oriented towards the display.

13. The device of claim 4, wherein the human face is a first human face and the user identifier is a first user identifier, and wherein the at least one processor is further configured to access the at least one memory and execute the computer-executable instructions to:

determine a second human face in the ambient environment;

determine a second user identifier associated with the second human face;

determine that the second user identifier is not associated with the location or the display; and cease presentation of the first media content.

14. The device of claim 4, wherein the human face is a first human face and the user identifier is a first user identifier, and wherein the at least one processor is configured to determine the first media content of the set of media content associated with the user identifier in the database index by executing the computer-executable instructions to:

determine that the first user identifier is associated with a second user identifier; and determine that the second user identifier is associated with the first media content, wherein the first media content comprises a first image of a second human face associated with the second user identifier;

wherein the first media content does not comprise a second image of the first human face.

15. The device of claim 4, wherein the set of media content comprising pre-indexed images and videos is stored locally at the device.

16. A method comprising:

determining, by one or more computer processors coupled to at least one memory, a human face in an ambient environment;

determining a user identifier associated with the human face;

determining a database index comprising relationships between media content and user identifiers;

determining a location associated with a display, wherein the location is static;

determining that the user identifier is associated with the location of the display;

determining a set of media content available to the one or more computer processors and for which the user identifier is authorized to access, the set of media content comprising pre-indexed images and videos;

determining first media content of the set of media content associated with the user identifier in the database index; and initiating presentation of the first media content at the display in the ambient environment.

17. The method of claim 16, wherein the human face is a first human face and the user identifier is a first user identifier, the method further comprising:

determining a second human face in the ambient environment;

determining a second user identifier associated with the second human face;

determining second media content of the set of media content, wherein the second media content is associated with the first user identifier or the second user identifier; and initiating presentation of the second media content at the display.

18. The method of claim 16, wherein the human face is a first human face and the user identifier is a first user identifier, the method further comprising:

determining a second human face in the ambient environment;

determining a second user identifier associated with the second human face; and determining that the first user identifier is prioritized over the second user identifier.

19. The method of claim 16, wherein the human face is a first human face and the user identifier is a first user identifier, the method further comprising:

determining a second human face in the ambient environment;

determining a second user identifier associated with the second human face;

determining that the second user identifier is not associated with the location or the display; and ceasing presentation of the first media content.

* * * * *